June 5, 1951 P. SAXTON 2,555,458
CUTTING MACHINE MEMBER
Filed Nov. 13, 1945
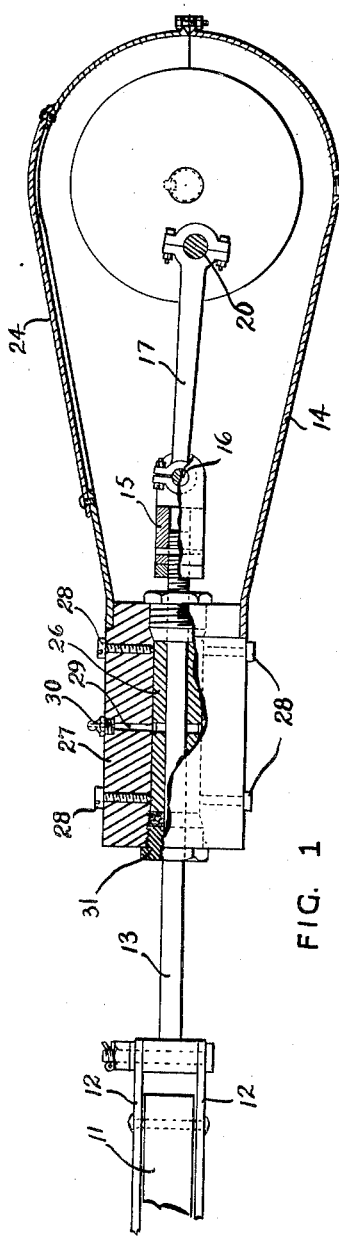
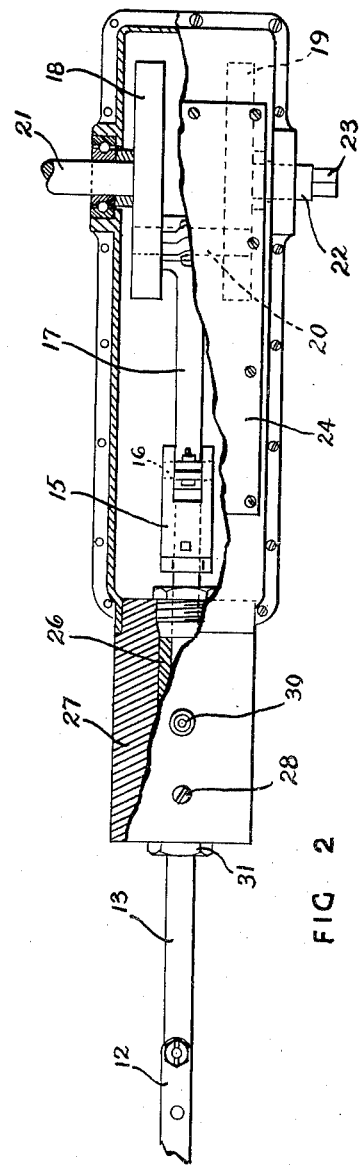
INVENTOR
PAUL SAXTON,
BY McMorrow, Berman and Davidson
ATTORNEYS Patented June 5, 1951

2,555,458

UNITED STATES PATENT OFFICE 2,555,458

CUTTING MACHINE MEMBER

Paul Saxton, Steamboat Springs, Colo.

Application November 13, 1945, Serial No. 628,214

3 Claims. (Cl. 308—5)

This invention relates to cutting machines such as mowing machines and the like, and more particularly to a power transmitting mechanism for converting rotary applied power to reciprocating cutting action of the cutting arm of a machine of the above type.

A main object of the invention is to provide a novel and improved power transmitting mechanism for converting rotary power applied thereto to reciprocating motion of the movable blade-carrying arm of a cutting machine, said mechanism being characterized by extreme simplicity of construction and smoothness of operation.

A further object of the invention is to provide an improved mechanism for reciprocating a blade-carrying movable arm of a mower or similar machine with respect to the stationary co-operating portions thereof, said mechanism being contained in an oil chamber for lubricating the mechanism and for insuring minimum wear of the parts thereof.

Further objects and advantages of the invention will appear from the following description and claims, and from the accompanying drawings, wherein:

Figure 1 is a side elevational view, partly in cross-section, of a power transmitting mechanism for a cutting machine in accordance with this invention.

Figure 2 is a top view, partly in section, of the mechanism of Figure 1.

Referring to the drawings, 11 designates an arm carrying the movable blades of a cutting machine, such as a mower. Said blades are arranged in a manner well known in the art so as to cooperate with a set of stationary blades or shearing edges to provide a cutting action responsive to reciprocation of cutting arm 11. The cutting mechanism is supported so as to extend laterally of a supporting vehicle, such as a tractor, and to engage the plants or crops to be mowed or harvested as the vehicle advances.

Cutting arm 11 is secured to a pair of side bars 12, 12, which in turn are secured to a reciprocatory shaft or slide 13. Shaft or slide 13 extends into a crankcase-providing housing 14 where it is secured to a wristpin bearing member 15 which is connected by a wristpin 16 to a pitman 17. Pitman 17 is received between a pair of flywheel members 18 and 19 and is connected thereto by a crank pin 20. A power shaft 21 is connected to flywheel 18. A short stub shaft 22 is connected to flywheel 19, said shaft 22 being formed externally of housing 14 with a squared end 23 for engagement by a wrench when it is desired to actuate the mechanism manually, for example, for releasing the cutting blades when they have become jammed.

Housing 14 is filled with oil to a substantial level so that the parts contained therein are continuously lubricated. A removable top cover-plate 24 is provided so that access may be had at times to the interior of said housing. An oil plug 25 is provided at the bottom of the housing for draining out the oil when desired.

Shaft or slide 13 reciprocates in a sleeve bearing 26 contained in an end block 27 secured to housing 14. Bearing 26 is secured in position in end block 27 by set screws 28, 28, and a grease hole 29, provided with a lubricating fitting plug 30 is provided for lubricating the bearing. Packing glands 31 are provided at the outer and inner ends of block 27 for sealing shaft or slide 13 with respect to said block against the escape of oil.

Rotation of power shaft 21 rotates flywheels 18 and 19 and causes a reciprocating motion to be imparted to shaft or slide 13, the flywheels acting to balance the mechanism. Since the mechanism is substantially self-lubricating, it will require very little attention during operation.

While a specific embodiment of a power transmitting mechanism for a cutting machine has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A crosshead comprising a block provided with a bore extending therethrough, a sleeve bearing arranged within said bore and secured to said block for slidably supporting a reciprocating member, a packing gland extending inwardly from each end of said bore for slidably embracing said reciprocating member, each of said glands bearing against the end of the sleeve bearing adjacent thereto and being fixedly secured to said block to thereby form a sealed slide-way, and port means on one side of said block extending inwardly through said block and said bearing sleeve for the introduction of lubricant into the interior of said sleeve.

2. A crosshead comprising a block provided with a bore extending therethrough, a sleeve bearing arranged within said bore and secured to said block for slidably supporting a reciprocating member, a packing gland extending inwardly from each end of said bore for slidably embracing said reciprocating member, each of said glands bearing against the end of the sleeve bearing adjacent thereto and being fixedly secured to said block to thereby form a sealed slideway, port means positioned on one side of said block extending inwardly through said block and said bearing sleeve for the introduction of lubricant into the interior of said sleeve, and a closure cap positioned exteriorly of said block and detachably connected to the adjacent end of said port means for closing the latter.

3. A crosshead comprising a block provided with a bore extending therethrough, a sleeve bearing arranged within said bore intermediate the ends of said block for slidably supporting a reciprocating member, securing means extending inwardly from opposed sides of said block and engaging said bearing sleeve for securing said sleeve within the bore of said block, a packing gland extending inwardly from each end of said bore for slidably embracing said reciprocating member, each of said glands bearing against the end of the sleeve bearing adjacent thereto and being fixedly secured to said block to thereby form a sealed slideway, port means positioned on one side of said block extending inwardly through said block and said bearing sleeve for the introduction of lubricant into the interior of said sleeve, and a closure cap positioned exteriorly of said block and detachably connected to the adjacent end of said port means for closing the latter.

PAUL SAXTON.

REFERENCES CITED

The following references are of record in the file of this patent:

UNITED STATES PATENTS

| Number | Name | Date |
|---|---|---|
| 719,739 | Burge et al. | Feb. 3, 1903 |
| 787,087 | Dumas | Apr. 11, 1905 |
| 1,310,512 | Sussex | July 22, 1919 |
| 1,400,282 | Gates | Dec. 13, 1921 |
| 1,668,976 | Peet et al. | May 8, 1928 |
| 2,214,777 | Rogers | Sept. 17, 1940 |